FIG. 1 COPOLYMER MELTING POINT VS. COMONOMER CONTENT

FIG. 2 COPOLYMER DENSITY VS. COMONOMER CONTENT

INVENTOR
CLAYTON T. ELSTON
BY Earl L. Handley
ATTORNEY

United States Patent Office 3,645,992
Patented Feb. 29, 1972

3,645,992
PROCESS FOR PREPARATION OF HOMOGENOUS RANDOM PARTLY CRYSTALLINE COPOLYMERS OF ETHYLENE WITH OTHER ALPHAOLEFINS
Clayton Trevor Elston, Kingston, Ontario, Canada, assignor to Du Pont of Canada, Limited, Montreal, Quebec, Canada
Filed Feb. 15, 1968, Ser. No. 705,701
Claims priority, application Canada, Mar. 2, 1967, 984,213
Int. Cl. C08f 15/04
U.S. Cl. 260—80.78                     13 Claims

ABSTRACT OF THE DISCLOSURE

Preparation of copolymers of ethylene and an alpha olefin having at least four carbon atoms using an inert solvent and a catalyst formed using particular ratios of an aluminum halide and a vanadium compound.

---

The present invention relates to the controlled continuous copolymerization of ethylene and one or more α-olefins to partly crystalline homogeneous random copolymers of closely controlled physical properties, and to the copolymers resulting therefrom.

The copolymerization of ethylene and various α-olefins (e.g. butene, hexene, octene, etc.) using a coordination catalyst system to yield partly crystalline copolymers with a range of physical properties is well known and is described in Canadian Patent 664,211 issued to Anderson and Stamatoff on June 4, 1963. The partly crystalline copolymers so prepared have a density and a stiffness intermediate between those of a linear polyethylene homopolymer (0.96 g./cc., 140,000 p.s.i) and a completely amorphous ethylene-α-olefin rubber (0.85 g./cc., less than 5000 p.s.i.). These partly crystalline copolymers possess physical properties which render them suitable for a wide range of practical applications such as film extrusion, blow moulding, injection moulding, wire coating and paper coating. The copolymer composition and molecular weight are adjusted to the optimum value for the particular end use desired.

It has now been discovered that the physical properties of such partly crystalline copolymers are dependent not only on their molecular weight distribution and the amount and type of comonomer incorporated into the copolymer but also upon the distribution of the comonomer units along the polymer backbone. It has further been discovered that such molecular weight and comonomer distribution can be controlled within desirable limits by employing coordination catalysts having narrow and unforeseen ranges of composition.

In the art, it is well known that within any given copolymer molecule, the comonomer distribution may be random, regular, block or combinations thereof. The present invention is concerned mainly with the preparation and properties of ethylene-α-olefin copolymers prepared in a constant environment reactor using coordination catalyst systems.

However, the comonomer distribution between the molecules of the copolymer must also be considered. Upon consideration of the latter distribution factor, two classes of copolymers have been noted, namely heterogeneous copolymers and homogeneous copolymers.

Heterogeneous copolymers may be defined as those in which the copolymer molecules do not have the same ethylene/comonomer ratio. These copolymers can be differentiated into three basic types dependent upon the degree of heterogeneity and whether the ethylene/comonomer ratio is a function of the size of the molecule. A heterogeneous copolymer (type I) might be defined as one in which the ethylene/comonomer ratio is not a function of the size of the copolymer molecule, i.e. the comonomer content of all the molecular weight fractions is the same but within each such fraction, there are individual molecules with a comonomer content above or below the average. Heterogeneous copolymers might also be defined as those in which the ethylene/comonomer ratio is a function of the molecular weight, with type II copolymers being those in which the ratio increases with molecular weight and type III copolymers being those in which the ratio decreases with molecular weight. Combinations of types I, II and III are also possible.

The preferred ethylene-α-olefin copolymers belong to the class designated as homogeneous. Homogeneous copolymers may be defined as those in which not only is the comonomer randomly distributed within a given molecule but all the copolymer molecules have the same ethylene/comonomer ratio. Homogeneous copolymers of narrow molecular weight distribution exhibit a reduced haze level in extruded film, higher impact strength, reduced tendency towards delamination in extruded articles and better balance of physical properties in the machine and transverse direction of extruded film when compared with conventional heterogeneous copolymers.

These subtle but extremely important comonomer distribution features have not been considered in the prior art relating to partly crystalline ethylene-α-olefin copolymers. It is only with the advent of new instrumental techniques that studies of possible molecular configurations can be made. Previously, fractionation of a whole copolymer into 10 to 20 sharp molecular fractions and subsequent comonomer analysis of the individual fractions had been assumed to offer unequivocal proof of distributional homogeneity of the copolymer. However, a heterogeneous random copolymer (type I) would not show any compositional heterogeneity under these conditions. Therefore, a constant ethylene/comonomer ratio as determined by analysis of sharp molecular weight fractions of a copolymer is a necessary but not a sufficient condition for proof of copolymer homogeneity. An additional and more reliable indication of copolymer homogeneity is the relationship between the crystalline melting point of the whole copolymer (or sharp molecular weight fraction) and its comonomer content.

The ethylene-α-olefin copolymers which are produced following the teachings of the prior art have been found to be random with respect to the comonomer distribution within the copolymer molecule but heterogeneous with respect to the copolymer distribution between molecules of the copolymer.

It is an object of the present invention to provide a process for the preparation of ethylene-α-olefin copolymers under continuous process conditions using catalyst systems and process variables so chosen that the copolymers produced have a narrow molecular weight distribution, a random distribution of comonomer units along the polymer backbone and are homogeneous between molecules with respect to their comonomer content.

A further object is the provision of ethylene copolymers with improved physical properties, said ethylene copolymers being the copolymerization product of ethylene and at least one other α-olefin, at least one such other α-olefin having four or more carbon atoms.

Accordingly, the present invention comprises a continuous process for the preparation of homogeneous random partly crystalline copolymers of narrow molecular weight distribution comprising ethylene and at least one other α-olefin, at least one such other α-olefin having four or more carbon atoms comprising the steps of polymerizing the monomers dissolved in an inert nonpolymerizable solvent therefor and for the copolymer to be prepared in an agitated reaction zone maintained at a pressure sufficient to maintain the monomers in solution and at a temperature of 40 to 110° C. in the presence of a catalyst prepared by mixing (A) an organoaluminum halide $R_nAlX_{3-n}$ wherein R is an alkyl or aryl radical, $n$ is not greater than 1.5 or less than 1.0 and X is Cl or Br and (B) a vanadium compound selected from (1) $VO(OR)_mX_{3-m}$ where R is an alkyl or aryl radical, $m$ is not less than 1 or more than 3, and X is Cl or Br and (2) vanadium oxyhalides soluble in the reaction medium; provided that when the vanadium compound is selected from (1) the vanadium concentration in the reaction zone is not greater than 0.260 millimole/liter of solution and the Al/V ratio in the reaction zone is not less than 5/1 when the α-olefin is a $C_4$ or $C_5$ α-olefin, not less than 9/1 when the α-olefin is a $C_6$ to $C_9$ α-olefin and not less than 12/1 when the α-olefin is a $C_{10}$ to $C_{20}$ α-olefin, and that when the vanadium compound is selected from (2) the vanadium concentration in the reactor is not greater than 0.160 millimole/liter of solution and the Al/V ratio in the reaction zone is not less than 5/1 when the α-olefin is a $C_4$ to $C_9$ α-olefin.

The present invention also comprises a copolymer of ethylene and at least one other α-olefin, at least one such other α-olefin having four or more carbon atoms, said copolymer being characterized by a narrow molecular weight distribution and a homogeneity index, as defined hereinafter, of at least 75.

The inert solvent used as a reaction medium may be an aliphatic, aromatic or cycloaliphatic hydrocarbon, such as heptane, toluene or cyclohexane. The solvent chosen must be a solvent for the monomer and for the polymer produced in the reaction. Cyclohexane is the preferred reaction medium.

Suitable α-olefins for use in practicing the process of the present invention are α-olefins having at least four carbon atoms, such as, for example, 1-butene, 1-hexene, 1-octene, or 1-octadecene. Preferred α-olefins are 1-butene and 1-octene. When the vanadium compound, used in preparing the catalyst, is an oxyhalide, the comonomer should not contain more than 9 carbon atoms.

When practicing the process of the present invention, the reaction zone should be maintained substantially free of concentration gradients. This may be accomplished by the use of a well-agitated reactor operating under essentially turbulent mixing conditions.

In the drawings attached hereto:

FIG. I is a graph representing the relationship between copolymer melting point and comonomer content;

FIG. II is a graph representing the relationship between copolymer density and comonomer content; and FIG. III is a graph representing the relationship between copolymer melt index and density difference from melt index 1.0.

Figure 1:
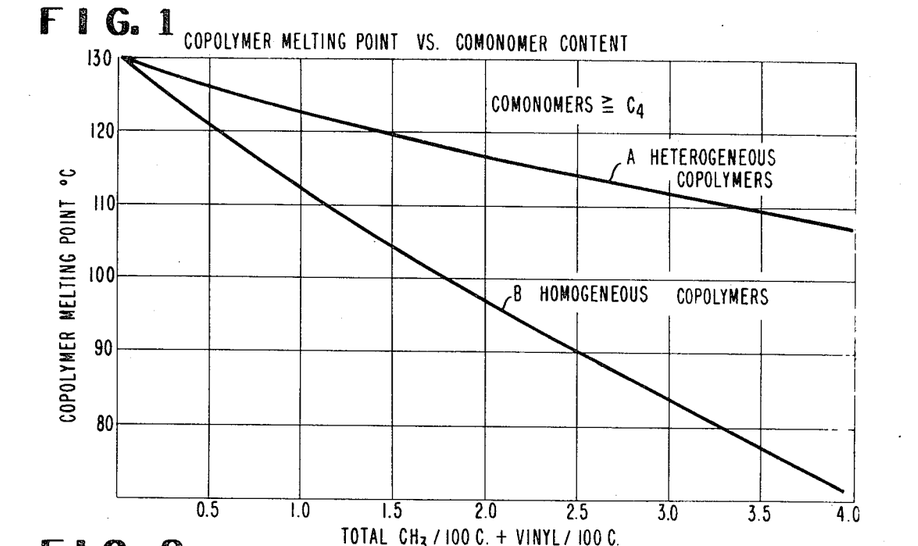
Figure 2:
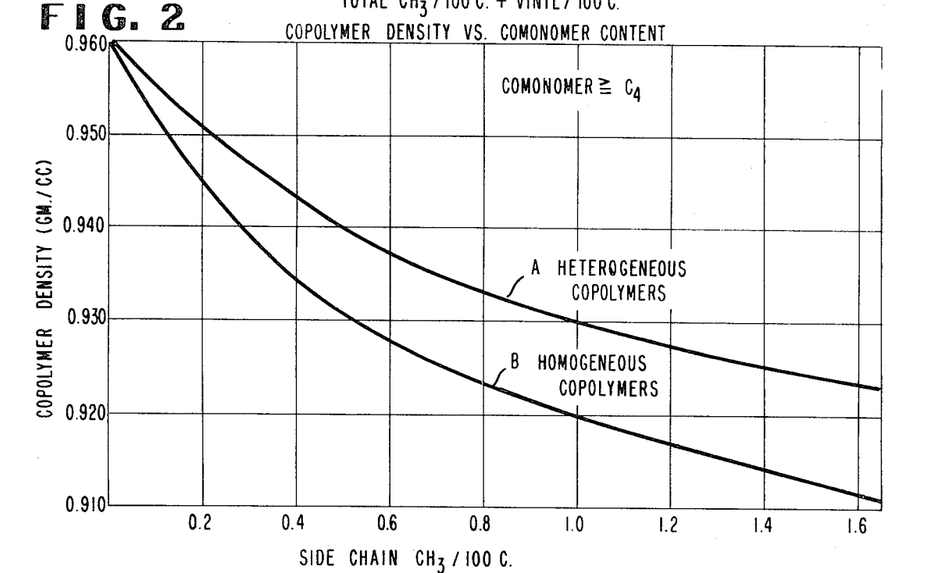
Figure 3:
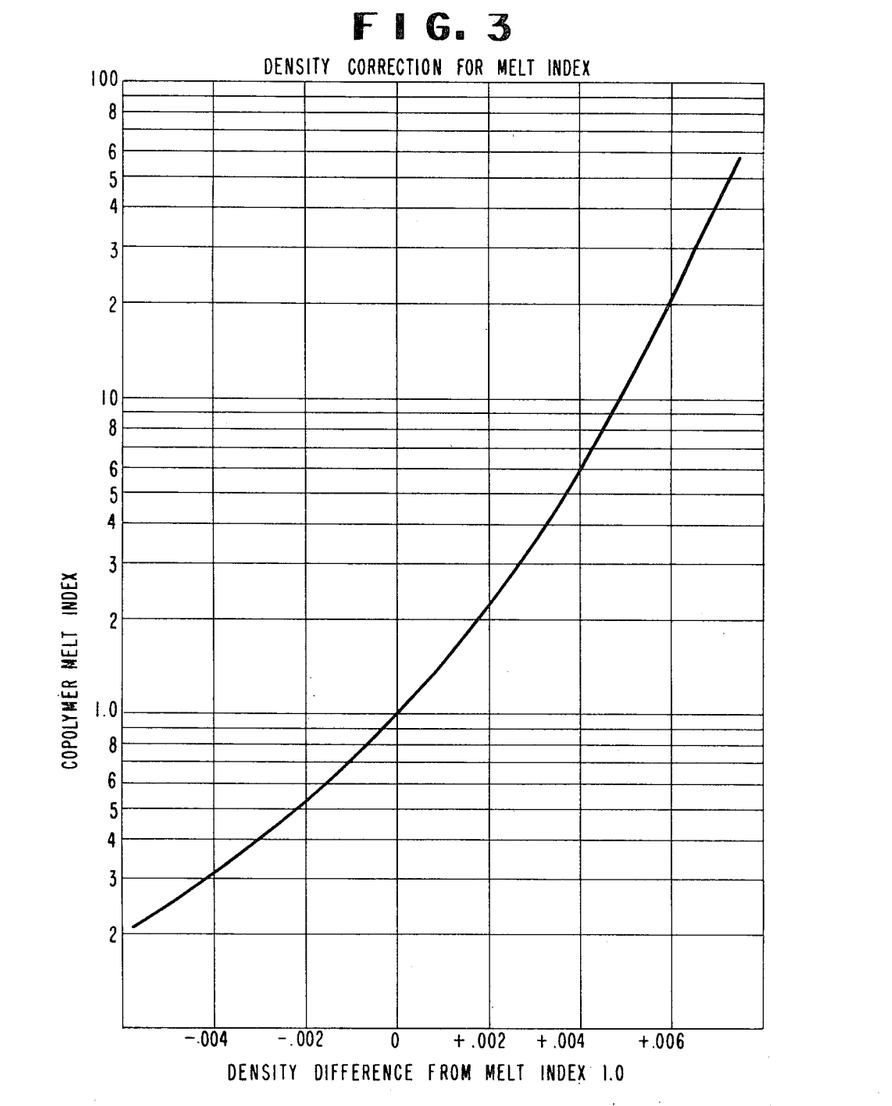

In FIG. I, lines A and B show the relationship between the crystalline melting point and comonomer content for various ethylene-α-olefin copolymers where the α-olefin is $\geq C_4$. Specifically, line A is a plot of Equation 1 below which is a computer generated equation based on regression analysis of the melting point-comonomer content data for a series of commercially available heterogeneous ethylene-butene copolymers and experimental heterogeneous ethylene-octene copolymers.

Equation 1

Copolymer melting point ° C.

$$=130-7.42(CH_3/100C+vinyl/100C) \\ +0.414(CH_3/100C+vinyl/100C)^2$$

Since heterogeneity is a relative rather than absolute term, it is obvious that no single melting point vs. comonomer content relationship can be defined for all heterogeneous copolymers.

Line B of FIG. I is a plot of Equation 2, a computer generated relationship based on regression analysis of the melting point-comonomer content data for copolymers prepared under the preferred conditions of the present invention (runs 11–28, Table II).

Equation 2

Copolymer melting point ° C.

$$=130-18.51(CH_3/100C+vinyl/100C) \\ +0.967(CH_3/100C+vinyl/100C)^2$$

It is evident, from FIG. I, that copolymers which are not homogeneous in comonomer content show crystalline melting points at a given comonomer content which are significantly higher than the melting points of homogeneous copolymers of the same comonomer content. Homogeneous-random ethylene-α-olefin copolymers (where the α-olefin is $\geq C_4$) are defined therefore as those copolymers whose crystalline melting point is related to their comonomer content by Equation 2. Copolymers with melting points greater than that predicted by Equation 2 are heterogeneous to the extent that their melting point exceeds the value given by Equation 2. If this melting point is elevated by comonomer heterogeneity to the point where it exceeds the value predicted by Equation 3 below, the copolymer is considered sufficiently heterogeneous to fall outside the specific embodiment of the present invention.

Equation 3

Copolymer melting point ° C.

$$=130-15.77(CH_3/100C+vinyl/100C) \\ +0.818(CH_3/100C+vinyl/100C)^2$$

Equation 3 defines the melting point of copolymers whose homogeneity index, as defined hereafter, is equal to 75.

In FIG. II, line A shows the relationship between copolymer density and comonomer content for heterogeneous copolymers of ethylene with α-olefins having at least four carbon atoms and line B shows this relationship for homogeneous copolymers of ethylene with α-olefins having at least four carbon atoms.

FIG. II shows that in the case of homogeneous copolymers the amount of comonomer required for a given copolymer density is considerably less than that required for a heterogeneous copolymer of equivalent density. This density difference is a useful index of copolymer homogeneity.

The following examples will help to illustrate the present invention:

Several runs were made using a well agitated continuous reactor system operating under essentially turbulent mixing conditions such that a constant environment, substantially free of concentration gradients, was maintained in the reactor. Ethylene, the desired α-olefin or α-olefins, the catalyst components and hydrogen if desired for melt index control were dissolved in the inert solvent and fed into the reactor, which was maintained under varying pressures, for varying contact times. The process conditions and the results of these runs were tabulated in Tables I-VIII which follow.

Polymer properties referred to hereinafter in the tables were determined by the following methods.

MELT INDEX

ASTM D-1238.

STRESS EXPONENT

The stress exponent is determined by measuring the throughput in a melt indexer at two stresses (2160 g. and 6480 g. loading) using procedures similar to the ASTM melt index procedure $$S.E. = \frac{1}{0.477}\left(\log \frac{\text{wt. extruded with 6480 g. wt.}}{\text{wt. extruded with 2160 g. wt.}}\right)$$

MELTING POINT

The differential thermal analysis determination of melting point was made using a Perkin-Elmer differential scanning calorimeter (DSC) calibrated for temperature with indium metal and flushed with dry nitrogen gas at a flow rate of 40 mls./min.

The samples were in the form of discs ¼″ in diameter, 3 to 4 mils thick and about 2 mg. in weight. Prior to the melting point determination, the samples were heated to 180° C. in the DSC apparatus, held there for 5 minutes and then cooled at a rate of 10° C./min. to 30° C. The melting points were determined on the subsequent melting profiles obtained at a heating rate of 20° C./min. The melting point was taken as the peak of the highest melting endotherm. Homogeneous copolymers were characterized by a sharp melting endotherm. Increased copolymer heterogeneity tended to broaden the melting endotherm as well as to raise the temperature at which the endotherm occurred.

Since the melting point data on polymer systems are critically dependent on annealing conditions, it is essential that the samples be put through the same melting-cooling cycle prior to melting point determination.

COMONOMER ANALYSIS

The determination of total alkyl groups was made by the ASTM method "Tentative Method of Test for Alkyl Groups in Polyethylenes based on Infrared Spectrophotometry—Proposed Revision of D2238-64T" using method A-1—Standard Sample Compensation Method $K'_{1378}$ for alkyl groups greater than $C_3$ was taken to be 0.110; $K'_{1378}$ for ethyl groups was taken to be 0.074 and the factor $f_{1378}$, obtained by calibration with cetane, was determined to be 141.5. The total number of alkyl groups was determined and reported in terms of total methyl groups per 100 carbon atoms.

The number of side chain methyl groups was obtained by subtracting the number of terminal methyl groups from the total number of methyl groups. The number of terminal methyl groups was calculated from the following formula:

No. of terminal methyl groups $= V + 2Vd + 2T$ where

V = number of vinyl groups/100 carbon atoms
Vd = number of vinylidene groups/100 carbon atoms
T = number of trans groups/100 carbon atoms.

The concentration of vinyl, vinylidene and trans unsaturation groups in the copolymers was determined by infrared spectrophotometric absorbances at 908, 889 and 965 cm.$^{-1}$ using molar extinction coefficients of 121.0, 103.4 and 85.4 respectively.

For normal alkyl groups the number of side chain methyl groups also represents the number of branches and is related directly to the comonomer content of the copolymers.

COPOLYMER DENSITY

Copolymer density was determined by ASTM Method D1505-63T. Since copolymer density is related to both comonomer content and copolymer molecular weight (or melt index), the observed density was corrected to melt index 1.0 using the relationship given in FIG. III.

HOMOGENEITY INDEX

This is an empirical value of copolymer homogeneity obtained from FIG. I by taking the melting point difference between lines A and B, at any given CH$_3$/100C content, as equal to 100. The homogeneity index of a copolymer is, therefore, taken as its relative position between these two guide lines.

Mathematically the homogeneity index of a given copolymer can be calculated from its melting point and comonomer content using Equation 4 below.

Equation 4

$$HI = 100\left[\frac{130 - 7.42(CH_3) + 0.414(CH_3)^2 - MP_{TC}}{11.09 CH_3 - 0.553(CH_3)^2}\right]$$

where

HI = homogeneity index
CH$_3$ = total CH$_3$/100C + vinyl/100C
MP$_{TC}$ = melting point of copolymer.

It should be noted that only homogeneous copolymers of ethylene and α-olefins of at least four carbon atoms follow the melting point relationship of Equation 2 or line B of FIG. I. The determination of homogeneity index is not applicable, therefore, to terpolymers where propylene is one of the comonomers.

TABLE I.—COPOLYMERIZATION SYNTHESIS CONDITIONS—HETEROGENEOUS COPOLYMERS

| Run Number | 1 | 2 | 3 | 4 | 5 | 6 | 7 | 8 | 9 | 10 |
|---|---|---|---|---|---|---|---|---|---|---|
| Ethylene feed (g./minute) | 19.6 | 16.2 | 16.1 | 0.257 | 0.257 | 0.257 | 0.257 | 0.257 | 0.260 | 0.256 |
| Comonomer | 1-butene | 1-octene | 1-butene | 1-butene | 1-butene | 1-butene | 1-butene | 1-octene | 1-butene | 1-butene |
| Comonomer feed (g./minute) | 11.8 | 13.1 | 4.4 | 0.105 | 0.105 | 0.163 | 0.257 | 0.257 | 0.118 | 0.257 |
| Solvent (ml./minute) | 361 | 364 | 400 | 14.64 | 14.72 | 14.75 | 13.36 | 12.62 | 12.90 | 12.23 |
| Cocatalyst | (Isoprenyl)₃Al | (Isoprenyl)₃Al | (Isoprenyl)₃Al | (Isobutyl)₂AlCl | (Isobutyl)₂AlCl | (Isobutyl)₂AlCl | (Ethyl)₂AlCl | (Ethyl)AlCl₂ | (Ethyl)AlCl₂ | (Ethyl)AlCl₂ |
| Catalyst | VOCl₃-TiCl₄ V/Ti=3.0 | VOCl₃-TiCl₄ V/Ti=3.0 | VOCl₃ | V(acetylacetone)₃ | V(acetylacetone)₃ | VOCl₃ | VO(O-n-butyl)₃ | VOCl₃ | VOCl₃ | VOCl₃ |
| Cocatalyst/catalyst ratio | 1.48 | 1.50 | 0.49 | 10.8 | 5.7 | 14.4 | 14.9 | 15.4 | 15.0 | 15.0 |
| Catalyst concentration in reactor (millimoles/liter) | 0.22 | 0.197 | 0.61 | 0.197 | 0.197 | 0.092 | 0.126 | 0.54 | 0.48 | 0.58 |
| Reactor temperature, °C | 195 | 176 | 125 | 100 | 100 | 100 | 100 | 120 | 122 | 122 |
| Reactor contact time (minute) | 2.06 | 2.05 | 6.3 | 2.7 | 2.7 | 2.68 | 2.97 | 3.14 | 2.97 | 3.25 |
| Ethylene conversion | 0.994 | 0.978 | 0.846 | 0.770 | 0.822 | 0.547 | 0.619 | 0.538 | 0.479 | 0.536 |
| Copolymer melt index (M.I.) | 2.85 | 1.50 | 2.21 | 22.0 | 1.37 | 8.1 | 11.2 | 1.20 | 12.3 | 0.87 |
| Copolymer stress exponent | 1.38 | 1.37 | 1.61 | — | 1.36 | 1.34 | — | 2.07 | — | — |
| Copolymer density | 0.9220 | 0.9217 | 0.9206 | 0.9287 | 0.9225 | 0.9253 | 0.9368 | 0.9347 | 0.9366 | 0.9311 |
| Copolymer density (corrected to M.I. 1.0) | 0.9197 | 0.9207 | 0.9187 | 0.9227 | 0.9207 | 0.9210 | 0.9318 | 0.9342 | 0.9314 | 0.9315 |
| Copolymer total CH₃/100 C | 2.00 | 2.10 | 1.84 | 1.49 | 1.65 | 1.32 | 1.28 | 1.15 | 1.00 | 1.46 |
| Copolymer side chain CH₃/100 C | 1.80 | 2.01 | 1.70 | 1.43 | 1.59 | 0.98 | 1.19 | 0.98 | 0.86 | 1.31 |
| Copolymer melting point, °C | 116.7 | 119.7 | 116.5–119.6 | 115.0–117.0 | 113.4–115.4 | 113.9 | 118.8 | 105.9–109.5–117.5 | 116.1 | 108.9–116.5–119.6 |
| Homogeneity index | 0 | -17 | -18 | -10 | 20 | 23.1 | 18 | 36 | 65 | 5 |
| Hydrogen (micromoles/minute) | Nil | Nil | 2430 | 26.5 | 12.4 | — | 20.3 | Nil | Nil | Nil |
| Catalyst formation conditions | Premixed | Premixed | In situ | In situ | In situ | In situ | In situ | In situ | In situ | In situ |

TABLE II.—COPOLYMER SYNTHESIS CONDITIONS—HOMOGENEOUS COPOLYMERS

| Run Number | 11 | 12 | 13 | 14 | 15 | 16 | 17 | 18 | 19 |
|---|---|---|---|---|---|---|---|---|---|
| Ethylene feed (g./minute) | 0.257 | 0.257 | 0.256 | 0.257 | 0.257 | 0.257 | 0.138 | 0.258 | 0.257 |
| Comonomer | 1-octene | 1-octene | 1-octene | 1-octene | 1-butene | 1-butene | 1-butene | 1-octene | 1-octadecene |
| Comonomer feed (g./minute) | 0.257 | 0.257 | 0.257 | 0.257 | 0.0970 | 0.202 | 0.0913 | 0.150 | 0.579 |
| Solvent (ml./minute) | 12.89 | 12.23 | 12.29 | 12.22 | 12.78 | 13.23 | 6.56 | 12.75 | 12.99 |
| Catalyst | (Ethyl)AlCl₂ | (Ethyl)₁.₂₅AlCl₁.₇₅ | (Ethyl)₁.₅AlCl₁.₅ | (Ethyl)AlCl₂ | (Ethyl)AlCl₂ | (Ethyl)AlCl₂ | (Ethyl)AlCl₂ | (Ethyl)AlCl₂ | (Ethyl)AlCl₂ |
| Cocatalyst | VO(O-n-butyl)₃ | VO(O-n-butyl)₃ | VO(O-n-butyl)₃ | VOCl₃ | VO(O-n-butyl)₃ | VO(O-n-butyl)₃ | VO(O-n-butyl)₃ | VO(O-n-butyl)₃ | VO(O-n-butyl)₃ |
| Catalyst/cocatalyst ratio | 14.8 | 14.9 | 14.7 | 15.3 | 15.3 | 14.7 | 15.1 | 14.8 | 14.7 |
| Catalyst concentration in reactor (millimoles liter) | 0.203 | 0.134 | 0.138 | 0.132 | 0.129 | 0.123 | 0.122 | 0.0973 | 0.129 |
| Reactor temperature, °C | 100 | 100 | 100 | 100 | 100 | 100 | 100 | 100 | 100 |
| Reactor contact time (minutes) | 3.25 | 3.25 | 3.23 | 3.25 | 3.10 | 3.00 | 6.05 | 3.11 | 3.06 |
| Ethylene conversion | 0.620 | 0.557 | 0.583 | 0.445 | 0.686 | 0.564 | 0.677 | 0.577 | 0.532 |
| Copolymer melt index (M.I.) | 11.5 | 1.41 | 2.13 | 5.21 | 3.3 | 9.16 | 2.08 | 0.58 | 6.94 |
| Copolymer stress exponent | — | 1.30 | 1.17 | 1.19 | 1.19 | 1.00 | 1.22 | 1.24 | 1.18 |
| Copolymer density | 0.9217 | 0.9243 | 0.9219 | 0.9259 | 0.9235 | 0.9193 | — | 0.9241 | 0.9210 |
| Copolymer density (corrected to M.I. 1.0) | 0.9218 | 0.9236 | 0.9203 | 0.9223 | — | 0.9148 | 0.9154 | 0.9262 | 0.9168 |
| Copolymer total CH₃/100 C and vinyl unsaturation | 1.27 | 0.94 | 1.08 | 1.02 | 1.10 | 1.56 | 1.39 | 0.67 | 1.26 |
| Copolymer side chain CH₃/100 C | 1.13 | 0.84 | 0.99 | 0.91 | 1.04 | 1.48 | 1.32 | 0.60 | 1.10 |
| Copolymer melting point, °C | 108.8 | 111.6 | 110.8 | 112.6 | 110.7 | 105.6 | 107.1 | 115.8 | 107.3 |
| Homogeneity index | 93 | 116 | 103 | 95 | 100 | 86 | 93 | 180 | 100 |
| Hydrogen (micromoles/minute) | Nil | Nil | Nil | Nil | Nil | Nil | Nil | Nil | Nil |
| Catalyst formation conditions | In situ | In situ | In situ | In situ | In situ | In situ | In situ | In situ | In situ |

| Run Number | 20 | 21 | 22 | 23 | 24 | 25 | 26 | 27 | 28 |
|---|---|---|---|---|---|---|---|---|---|
| Ethylene feed (g./minute) | 0.257 | 0.257 | 0.256 | 0.257 | 0.257 | 0.363 | 0.257 | 0.288 | 5.0 |
| Comonomer | 1-octene | 1-octene | 1-octene | 1-octene | 1-octene | 1-octene | 1-octene | 1-butene | 1-butene |
| Comonomer feed (g./minute) | 0.257 | 0.0858 | 0.130 | 0.257 | 0.257 | 0.363 | 0.770 | 0.287 | 2.9 |
| Solvent (ml./minute) | 12.89 | 13.48 | 14.06 | 12.17 | 12.18 | 18.10 | 15.09 | 15.08 | 220 |
| Catalyst | (Ethyl)AlCl₂ | (Ethyl)AlCl₂ | (Ethyl)AlCl₂ | (Ethyl)AlCl₂ | (Ethyl)₁.₅AlCl₁.₅ | (Ethyl)₁.₅AlCl₁.₅ | (Ethyl)₁.₅AlCl₁.₅ | (Ethyl)₁.₅AlCl₁.₅ | (Ethyl)AlCl₂ |
| Cocatalyst | VO(O-n-butyl)₃ | VO(O-n-butyl)₃ | VO(O-n-butyl)₃ | VO(O-n-butyl)₃ | VO(O-n-decyl)₂Cl | VO(O-n-decyl)₂Cl | VO(O-n-decyl)₂Cl | VO(O-n-decyl)₂Cl | VOCl₃ |
| Catalyst/cocatalyst ratio | 11.2 | 14.0 | 14.4 | 13.35 | 14.0 | 10.0 | 10.0 | 9.9 | 15.0 |
| Catalyst concentration in reactor (millimoles/liter) | 0.131 | 0.123 | 0.117 | 0.136 | 0.133 | 0.140 | 0.177 | 0.0917 | 0.205 |
| Reactor temperature, °C | 100 | 100 | 100 | 100 | 100 | 90 | 50 | 50 | 100 |
| Reactor contact time (minutes) | 3.08 | 2.95 | 2.82 | 3.27 | 3.25 | 3.77 | 4.79 | 4.92 | 8.8 |
| Ethylene conversion | 0.557 | 0.677 | 0.602 | 0.557 | 0.547 | 0.610 | 0.762 | 0.810 | 0.650 |
| Copolymer melt index (M.I.) | 5.29 | 1.11 | 1.47 | 2.97 | 3.12 | 1.35 | 2.63 | 0.89 | 20.2 |
| Copolymer stress exponent | 1.22 | 1.25 | 1.24 | 1.18 | 1.20 | 1.22 | 1.15 | 1.11 | 1.19 |

3,645,992

TABLE II.—COPOLYMER SYNTHESIS CONDITIONS—HOMOGENEOUS COPOLYMERS

| Run number | 20 | 21 | 22 | 23 | 24 | 25 | 26 | 27 | 28 |
|---|---|---|---|---|---|---|---|---|---|
| Copolymer density | 0.9282 | 0.9282 | 0.9263 | 0.9227 | 0.9210 | 0.9142 | 0.8770 | 0.8050 | 0.9184. |
| Copolymer density (corrected to M.I. 1.0) | 0.9183 | | | 0.9201 | 0.9183 | 0.9134 | 0.8746 | 0.8980 | 0.9125. |
| Copolymer total CH₃/100C and vinyl unsaturation | 1.22 | 0.54 | 0.74 | 1.06 | 1.16 | 1.68 | 4.80 | 3.56 | 1.50. |
| Copolymer side chain CH₃/100C | 1.12 | 0.46 | 0.67 | 1.00 | 1.08 | 1.60 | 4.70 | 3.54 | 1.40. |
| Copolymer melting point, °C | 110.2 | 116.9 | 115.1 | 110.8 | 110.0 | 104.3 | 63.0 | 76.3 | 103.9. |
| Homogeneity index | 89 | 160 | 122 | 104 | 98 | 84 | 99 | 99 | 102. |
| Hydrogen (micromoles/minute) | Nil | Nil | Nil | Nil | Nil | Nil | Nil | 17.7 | Nil. |
| Catalyst formation conditions | In situ | In situ | In situ | In situ | In situ | In situ | In situ | In situ | In situ. |

ᵃ 3 mole (ethyl)AlCl₂, 1 mole (ethyl)₂AlCl; ᵇ 1 mole (ethyl)AlCl₂, 1 mole (ethyl)AlCl₂.

TABLE III.—EFFECT OF COMONOMER SIZE ON COPOLYMER HOMOGENEITY

| Run Number | 29 | 30 | 31 | 32 |
|---|---|---|---|---|
| Ethylene feed (g./minute) | 0.257 | 0.257 | 0.257 | 0.257 |
| Comonomer | 1-octene | 1-octadecene | 1-butene | 1-octene. |
| Comonomer feed (g./minute) | 0.257 | 0.570 | 0.0808 | 0.257. |
| Solvent (ml./minute) | 12.22 | 13.02 | 12.88 | 12.62 |
| Cocatalyst | (Ethyl)AlCl₂ | (Ethyl)AlCl₂ | (Ethyl)AlCl₂ | (Ethyl)AlCl₂. |
| Catalyst | VOCl₃ | VOCl₃ | VOCl₃ | VOCl₃. |
| Cocatalyst/catalyst ratio | 15.3 | 14.8 | 14.1 | 15.0. |
| Catalyst concentration in reactor (millimoles/liter) | 0.132 | 0.130 | 0.538 | 0.528. |
| Reactor temperature, °C | 100 | 100 | 100 | 105. |
| Reactor contact time (minutes) | 3.25 | 3.05 | 3.09 | 3.16. |
| Ethylene conversion | 0.445 | 0.420 | 0.722 | 0.605. |
| Copolymer melt index (M.I.) | 1.19 | 1.39 | 17.4 | 1.28. |
| Copolymer stress exponent | 5.21 | 2.96 | | 2.05. |
| Copolymer density | 0.9259 | 0.9230 | 0.9250 | 0.9287. |
| Copolymer density (corrected to M.I. 1.0) | 0.9223 | 0.9204 | 0.9195 | 0.9280. |
| Copolymer total CH₃/100C and vinyl unsaturation | 1.02 | 0.93 | 1.46 | 1.40. |
| Copolymer side chain CH₃/100C | 0.91 | 0.80 | 1.33 | 1.26. |
| Copolymer melting point, °C | 112.6 | 108.4, 114.0, 118.8 | 109.9 | 107.2, 115.1, 118.8. |
| Homogeneity index | 95 | 46 | 66 | 10. |
| Hydrogen (micromoles/minute) | Nil | Nil | Nil | Nil. |
| Catalyst formation conditions | In situ | In situ | In situ | In situ. |

TABLE IV.—EFFECT OF REACTOR TEMPERATURE ON COPOLYMER HOMOGENEITY

| Run number | 33 | 34 | 35 | 36 | 37 | 38 | 39 |
|---|---|---|---|---|---|---|---|
| Ethylene feed (g./minute) | 0.257 | 0.257 | 0.361 | 0.360 | 0.351 | 0.350 | 0.351. |
| Comonomer | 1-butene | 1-butene | 1-octene | 1-octene | 1-octene | 1-octene | 1-octene. |
| Comonomer feed (g./minute) | 0.099 | 0.105 | 18.10 | 17.99 | 18.06 | 18.01 | 17.48. |
| Solvent (ml./minute) | 12.79 | 12.76 | 18.10 | 17.99 | 18.06 | 18.01 | 17.48. |
| Cocatalyst | (Ethyl)₁.₅AlCl₁.₅ | (Ethyl)AlCl₂ | (Ethyl)₁.₅AlCl₁.₅ | (Ethyl)₁.₅AlCl₁.₅ | (Ethyl)₁.₅AlCl₁.₅ | (Ethyl)₁.₅AlCl₁.₅ | (Ethyl)₁.₅AlCl₁.₅ |
| Catalyst | VO(O-n-butyl)₃ | VO(O-n-butyl)₃ | (Ethyl)AlCl₃ | VO(O-n-decyl)₃Cl | VO(O-n-decyl)₂Cl | VOCl₃ | VOCl₃. |
| Cocatalyst/catalyst ratio | 7.5 | 7.3 | 10 | 10 | 10 | 10 | 10. |
| Catalyst concentration in reactor (millimoles/liter) | 0.126 | 0.122 | 0.140 | 0.135 | 0.136 | 0.134 | 0.139. |
| Reactor temperature, °C | 130 | 150 | 90 | 120 | 110 | 115 | 120 |
| Reactor contact time (minutes) | 2.98 | 2.90 | 3.78 | 3.76 | 3.69 | 3.69 | 3.77. |
| Ethylene conversion | 0.440 | 0.153 | 0.61 | 0.36 | 0.30 | 0.22 | 0.26. |
| Copolymer melt index (M.I.) | 0.0676 | 2.25 | 1.35 | 1.60 | 1.56 | 0.63 | 0.11. |
| Copolymer stress exponent | | 2.02 | 1.22 | 2.56 | 1.29 | 1.53 | 1.85. |
| Copolymer density | 0.9320 | 0.9421 | 0.9142 | 0.9255 | 0.9255 | 0.9304 | 0.9220. |
| Copolymer density (corrected to M.I. 1.0) | | 0.9401 | 0.9134 | 0.9269 | 0.9244 | 0.9304 | 0.9290. |
| Copolymer total CH₃/100C and vinyl unsaturation | 0.75 | 0.75 | 1.68 | 1.16 | 0.97 | 0.91 | 1.10. |
| Copolymer side chain CH₃/100C | 0.66 | 0.58 | 1.60 | 1.00 | 0.88 | 0.81 | 0.98. |
| Copolymer melting point, °C | 117.4 | 120.0 | 104.3 | 114.3 | 114.3 | 115.8 | 116.3. |
| Homogeneity index | 91 | 58 | 84 | 62 | 87 | 80 | 52. |
| Hydrogen (micromoles/minutes) | Nil | Nil | Nil | Nil | Nil | Nil | Nil. |
| Catalyst formation conditions | In situ | In situ | In situ | In situ | In situ | In situ | In situ. |

TABLE V.—EFFECT OF ALKYL/ALUMINUM RATIO ON COPOLYMER HOMOGENEITY

| Run number | 40 | 41 |
|---|---|---|
| Ethylene Feed (g./minute) | 0.257 | 0.257. |
| Comonomer | 1-butene | 1-octene. |
| Comonomer Feed (g./minute) | 0.163 | 0.257. |
| Solvent (ml./minute) | 14.75 | 13.36. |
| Cocatalyst | (Isobutyl)₂AlCl | (Ethyl)₂AlCl. |
| Catalyst | VOCl₃ | VO(O-n-butyl)₃. |
| Cocatalyst/catalyst ratio | 14.4 | 14.9. |
| Catalyst concentrate in reactor (millimoles/liter) | 0.092 | 0.126. |
| Reactor temperature, °C | 100 | 100. |
| Reactor contact time (minutes) | 2.68 | 2.97. |
| Ethylene conversion | 0.547 | 0.619. |
| Copolymer melt index (M.I.) | 8.1 | 11.2. |
| Copolymer stress exponent | 1.34 | |
| Copolymer density | 0.9253 | 0.9368. |
| Copolymer density (corrected to M.I. 1.0) | 0.9210 | 0.9318. |
| Copolymer total CH₃/100C and vinyl unsaturation | 1.32 | 1.16. |
| Copolymer side chain CH₃/100C | 1.20 | 1.10. |
| Copolymer melting point, °C | 113.9 | 118.8. |
| Homogeneity index | 51 | 25. |
| Hydrogen (micromoles/minute) | 23.1 | 20.4. |
| Catalyst formation conditions | In situ | In situ. |

Runs 1 and 2 in Table I illustrate the copolymerization of ethylene with 1-butene and 1-octene respectively using coordination catalysts and reaction conditions of the prior art. The heterogeneous ethylene/1-butene copolymer of Run 1 shows a relationship between crystalline melting point and comonomer content which falls on line A of FIG. I and between copolymer density and comonomer content which falls on line A of FIG. II. The heterogeneous ethylene/1-octene copolymer of Run 2 shows a similar relationship between crystalline melting point and comonomer content and between copolymer density and comonomer content.

Runs 3 to 10 of Table I illustrate the copolymerization of ethylene with 1-butene (runs 3, 4, 5, 6 and 9) and with 1-octene (runs 7, 8 and 10) using synthesis conditions and catalyst formulations recommended by the prior art for the preparation of ethylene/propylene copolymers. The copolymers produced in Runs 3 to 10 are similar to the heterogeneous copolymers of Runs 1 and 2 as shown by comparison of the crystalline melting point and/or density of these copolymers (as a function of their comonomer content). It is apparent that the coordination catalysts systems of Runs 3 to 10 offer little or no improvement over the standard coordination catalysts of Runs 1 and 2.

TABLE VI.—EFFECT OF Al/V RATIO ON COPOLYMER HOMOGENEITY

| Run Number | 42 | 43 | 44 | 45 | 46 | 47 |
|---|---|---|---|---|---|---|
| Ethylene feed (g./minute) | 0.257 | 0.257 | 0.257 | 0.257 | 0.257 | 0.257. |
| Comonomer | 1-butene | 1-octene | 1-octene | 1-octene | 1-butene | 1-octene. |
| Comonomer feed (g./minute) | 0.099 | 0.257 | 0.257 | 0.257 | 0.097 | 0.174. |
| Solvent (ml./minute) | 13.33 | 13.56 | 13.03 | 13.27 | 12.78 | 12.89. |
| Cocatalyst | (Ethyl)AlCl₂ | (Ethyl)AlCl₂ | (Ethyl)AlCl₂ | (Ethyl)AlCl₂ | (Ethyl)₁.₅AlCl₁.₅ | (Ethyl)₁.₅AlCl₁.₅ |
| Catalyst | VO(O-n-butyl)₃ | VO(O-n-butyl)₃ | VO(O-n-butyl)₃ | VO(O-n-butyl)₃ | VOCl₃ | VOCl₃. |
| Cocatalyst/catalyst ratio | 5.1 | 8.8 | 7.4 | 4.8 | 5.0 | 5.9. |
| Catalyst concentration in reactor (millimoles/liter) | 0.142 | 0.120 | 0.126 | 0.125 | 0.130 | 0.129. |
| Reactor temperature, °C | 100 | 100 | 100 | 100 | 100 | 100. |
| Reactor contact time (minutes) | 2.98 | 2.93 | 3.04 | 2.99 | 3.10 | 3.10. |
| Ethylene conversion | 0.712 | 0.602 | 0.613 | 0.650 | 0.650 | 0.620 |
| Copolymer melt index (M.I.) | 1.47 | 11.85 | 4.72 | 3.78 | 1.50 | 1.13. |
| Copolymer stress exponent | 1.38 | 1.13 | 1.18 | 1.31 | 1.20 | 1.22. |
| Copolymer density | 0.9210 | 0.9222 | 0.9220 | 0.9234 | 0.9281 | 0.9228. |
| Copolymer density (corrected to M.I. 1.0) | 0.9200 | 0.9171 | 0.9185 | 0.9204 | 0.9270 | 0.9224. |
| Copolymer total CH₃/100C and vinyl unsaturation | 1.28 | 1.39 | 1.34 | 1.39 | 0.76 | 0.88. |
| Copolymer side chain CH₃/100C | 1.19 | 1.29 | 1.22 | 1.28 | 0.70 | 0.80. |
| Copolymer melting point, °C | 109.8 | 108.9 | 106.8, 110.8 | 106.8, 112.6, 117.3 | 116.5 | 113.8. |
| Homogeneity index | 85 | 80 | 71 | 22 | 100 | 106. |
| Hydrogen (micromoles/minute) | 5.3 | 21.8 | 14.1 | 13.3 | 7.0 | 5.9. |
| Catalyst formation conditions | In situ | In situ | In situ | In situ | In situ | In situ. |

TABLE VII.—EFFECT OF VANADIUM CONCENTRATION ON COPOLYMER HOMOGENEITY

| Run number | 48 | 49 | 50 | 51 | 52 | 53 | 54 |
|---|---|---|---|---|---|---|---|
| Ethylene feed (g./minute) | 0.257 | 0.257 | 0.257 | 0.257 | 0.257 | 0.257 | 0.257. |
| Comonomer | 1-butene | 1-butene | 1-butene | 1-ocgene | 1-octene | 1-octene | 1-octene. |
| Comonomer feed (g./minute) | 0.0808 | 0.0473 | 0.105 | 0.257 | 0.257 | 0.257 | 0.259. |
| Solvent (ml./minute) | 12.88 | 12.69 | 13.98 | 12.62 | 12.22 | 12.16 | 13.48. |
| Cocatalyst | (Ethyl)AlCl₂ | (Ethyl)AlCl₂ | (Ethyl)AlCl₂ | (Ethyl)AlCl₂ | (Ethyl)AlCl₂ | (Ethyl)AlCl₂ | (Ethyl)AlCl₂. |
| Catalyst | VOCl₃ | VOCl₃ | VOCl₃ | VOCl₃ | VOCl₄ | VO(O-n-butyl)₂C. | VO(O-n-butyl)₂Cl. |
| Cocatalyst/catalyst ratio | 14.1 | 15.2 | 15.0 | 15.0 | 15.3 | 14.4 | 15.4. |
| Catalyst concentration in reactor (millimoles/liter) | 0.538 | 0.261 | 0.127 | 0.528 | 0.132 | 60.546 | 0.252. |
| Reactor temperature, °C | 100 | 100 | 100 | 105 | 100 | 100 | 100. |
| Reactor contact time (minutes) | 3.09 | 3.13 | 3.11 | 3.16 | 3.25 | 3.26 | 2.94. |
| Ethylene conversion | 0.722 | 0.720 | 0.512 | 0.605 | 0.445 | 0.650 | 0.572. |
| Copolymer melt index (M.I.) | 17.4 | 1.52 | 0.75 | 1.28 | 5.21 | 20.4 | 22.5. |
| Copolymer stress exponent | | | | 2.05 | 1.19 | | |
| Copolymer density | 0.9250 | 0.9277 | 0.9230 | 0.9287 | 0.9259 | 0.9237 | 0.9259. |
| Copolymer density (corrected to M.I. 1.0) | 0.9195 | 0.9267 | 0.9239 | 0.9280 | 0.9223 | 0.9179 | 0.9200. |
| Copolymer total CH₃/100C and vinyl unsaturation | 1.46 | 0.96 | 1.20 | 1.40 | 1.02 | 1.49 | 1.21. |
| Copolymer side chain CH₃/100C | 1.33 | 0.87 | 1.15 | 1.26 | 0.91 | 1.33 | 1.08. |
| Copolymer melting point, °C | 109.9 | 114.4 | 109.6 | 107.2, 115.1, 118.8 | 112.6 | 109.6 | 109.2. |
| Homogeneity index | 66 | 86 | 97 | 10 | 95 | 66 | 97. |
| Hydrogen (micromoles/minute) | Nil | Nil | Nil | Nil | Nil | Nil | Nil. |
| Catalyst formation conditions | In situ | In situ | In situ | In situ | In situ | In situ | In situ. | comonomer, di-n-butyl chlorovanadate (Run 53) produces a significantly more homogeneous copolymer than does VOCl$_3$ (Run 51). Even under optimum conditions, VOCl$_3$ yields a heterogeneous copolymer with 1-octadecene (Run 30) while VO(O-n-butyl)$_3$ yields a homogeneous 1-octadecene copolymer under otherwise identical conditions (Run 19).

The present invention is also applicable to interpolymers of ethylene and more than one α-olefin when at least one of the α-olefins contains four or more carbon atoms. Examples are the ethylene-octene-butene terpolymer of Run 55 and the ethylene-octene-propylene terpolymer of Run 56, Table VIII. These terpolymers are of practical interest because their physical properties are nearly equivalent to the corresponding octene copolymers and yet they contain considerably less of the high cost octene comonomer.

It should be noted that the limits of any individual process variable defining the area in which homogeneous copolymers can be prepared pertain only when the other defining process variables are at or near their optimum value for homogeneous copolymerization.

The ethylene/1-butene copolymer produced in Run 1 using a prior art coordination catalyst was subjected to fractionation and the results tabulated in the following table.

TABLE IX

Copolymer fractionation data:
Copolymer No. Run 1, Table I
Melt Index—2.85
Density—0.9220

[Amount fractionated—10.0 grams, percent recovery—97.12]

| | Fractionation— | | | | | |
|---|---|---|---|---|---|---|
| | Corrected fraction weight (grams) | Cumulative weight percent | Inherent viscosity | Weight average molecular weight $M_w \times 10^{-3}$ | Side chain $CH_3$/ 100 C | DSC melting point |
| Fraction No.: | | | | | | |
| 1 | (¹) | (¹) | (¹) | (¹) | (¹) | (¹) |
| 2 | 0.576 | 51.85 | 1.78 | 74 | 1.58 | |
| 3 | 0.797 | 44.98 | 1.22 | 46 | 1.73 | |
| 4 | 1.293 | 34.53 | 0.84 | 29 | 1.99 | |
| 5 | 0.530 | 25.42 | 0.65 | 19 | 2.15 | 116.0 |
| 6 | 0.717 | 19.18 | 0.48 | 13 | 2.31 | |
| 7 | 0.148 | 14.86 | 0.34 | 8 | | |
| 8 | 1.402 | 7.06 | 0.29 | 6.6 | | |
| | Refractionation— | | | | | |
| 1 | 0.371 | 98.32 | 5.22 | 320 | 0.77 | |
| 2 | 0.246 | 95.24 | 3.68 | 190 | 1.09 | |
| 3 | 0.757 | 90.22 | 2.94 | 145 | 1.27 | |
| 4 | 0.578 | 83.55 | 2.29 | 105 | 1.21 | |
| 5 | 0.334 | 78.99 | 1.93 | 84 | 1.48 | |
| 6 | 0.581 | 74.41 | 1.62 | 66 | 1.60 | 117.0 |
| 7 | 0.410 | 69.46 | 1.37 | 52 | 1.72 | |
| 8 | 0.479 | 56.01 | 1.18 | 44 | 1.91 | |
| 9 | 0.204 | 61.60 | 1.14 | 39 | | |
| 10 | 0.171 | 59.72 | 0.92 | 31 | | |
| 11 | 0.414 | 56.80 | 0.77 | 25 | | |
| Whole polymer | | | 1.37 | 77 | 1.80 | 116.7 |

¹ Used in refractionation.

From the above table, it is evident that the copolymer is heterogeneous in composition, that is, the comonomer content is not constant over the various molecular weight fractions. It should also be noted with respect to the comonomer distribution of these heterogeneous copolymers that the molecular weight fractions have crystalline melting points falling on line B of FIG. I. This indicates that the fractions are sharp in molecular weight but not in comonomer distribution and the overall

TABLE X

Copolymer fractionation data:
Copolymer No. Run 3, Table I
Melt Index—2.21
Density—0.9206

[Amount fractionated—10.0 grams, percent recovery—95.01]

| | Fractionation— | | | | | |
|---|---|---|---|---|---|---|
| | Corrected fraction weight (grams) | Cumulative weight percent | Inherent viscosity | Weight average molecular weight $M_w$ | Side chain $CH_3$/ 100C | DSC melting point |
| Fraction No.: | | | | | | |
| 1 | (¹) | (¹) | (¹) | (¹) | (¹) | (¹) |
| 2 | 0.558 | 55.42 | 1.49 | 59 | 2.09 | |
| 3 | 0.744 | 48.91 | 0.93 | 31.5 | 2.47 | |
| 4 | 0.475 | 42.81 | 0.77 | 24.5 | 2.67 | |
| 5 | 1.296 | 33.96 | 0.58 | 17 | 2.43 | |
| 6 | 0.222 | 26.37 | 0.46 | 12 | 2.48 | |
| 7 | 0.881 | 20.85 | 0.37 | 9 | 2.52 | |
| 8 | 1.645 | 8.24 | 0.17 | 3.2 | | |
| | Refractionation— | | | | | |
| 1 | 0.331 | 98.28 | 6.25 | 410 | 0.64 | |
| 2 | 0.331 | 94.97 | 4.67 | 275 | 0.91 | |
| 3 | 0.346 | 91.59 | 3.55 | 190 | | |
| 4 | 0.563 | 87.04 | 2.94 | 150 | 0.90 | |
| 5 | 0.487 | 81.79 | 2.33 | 108 | 0.95 | |
| 6 | 0.559 | 76.56 | 1.94 | 84 | 1.07 | |
| 7 | 0.406 | 71.74 | 1.62 | 66 | | |
| 8 | 0.481 | 67.30 | 1.33 | 51 | | |
| 9 | 0.252 | 63.64 | 1.07 | 37 | 1.22 | |
| 10 | 0.139 | 61.68 | 0.77 | 24.5 | | |
| 11 | 0.278 | 59.60 | 0.62 | 18 | | |
| Whole polymer | | | 1.32 | 73 | 1.70 | |

¹ Used in refractionation.

TABLE VIII.—HOMOGENEOUS TERPOLYMERS

| Run Number | 55 | 56 |
|---|---|---|
| Ethylene feed (g./minute) | 0.257 | 0.257 |
| Comonomer | 1-butene. 1-octene. | 1-octene. Propylene. |
| Comonomer feed (g./minute) | 0.0658___ 0.0974___ | 0.0974___ 0.0488. |
| Solvent (ml./minute) | 13.29 | 13.67 |
| Cocatalyst | (Ethyl) AlCl$_2$ | (Ethyl) AlCl$_2$ |
| Catalyst | VO(O-n-butyl)$_3$ | VO(O-n-butyl)$_3$ |
| Cocatalyst/catalyst ratio | 14.7 | 15.0 |
| Catalyst concentration in reactor (millimoles/liter) | 0.127 | 0.119 |
| Reactor temperature, °C | 100 | 100 |
| Reactor contact time (minutes) | 3.00 | 2.91 |
| Ethylene conversion | 0.603 | 0.680 |
| Copolymer melt index (M.I.) | 1.27 | 3.10 |
| Copolymer stress exponent | 1.16 | 1.15 |
| Copolymer density | 0.9223 | 0.9173 |
| Copolymer density (corrected to M.I. 1.0) | 0.9217 | 0.9147 |
| Copolymer total CH$_3$/100C and vinyl unsaturation | 0.94 | |
| Copolymer side chain CH$_3$/100C | }0.43_____ Hexyl¹__ <br> }0.50_____ Ethyl___ | 0.49_____ Hexyl¹. <br> 1.37_____ Methyl. |
| Copolymer melting point, °C | 111.3 | 105.8 |
| Homogeneity index | 120 | (²) |
| Hydrogen (micromoles/minute) | Nil | Nil |
| Catalyst formation conditions | In situ | In situ |

¹ Estimated from comonomer reactivity data.
² Copolymers containing methyl side chains do not fit the correlation of FIG. I.

Runs 11 to 28 illustrate the copolymerization of ethylene with 1-butene, 1-octene and 1-octadecene using reaction conditions equivalent to those used in Runs 3 to 10 except for the reactor temperature and the composition and concentration of the catalyst systems used. The copolymers produced show crystalline melting points which are sharp and well defined. Regression analysis of these data gave the relationship between methyl point and comonomer content as shown in Equation 2 and plotted as line B in FIG. I. The lower crystalline melting point of these copolymers in comparison with the heterogeneous copolymers of line A of FIG. I indicates the difference in structure between the two types of copolymers. Furthermore, it indicates that the lower melting copolymers contain less of the longer ethylene sequences (at a given comonomer content) than the higher melting counterparts and have a more homogeneous overall comonomer distribution.

Typical catalysts for copolymerization of ethylene and propylene to rubber-like copolymers based on alkyl aluminum halides and vanadium derivatives fail to produce partly crystalline homogeneous α-olefin copolymers under solution process conditions due to a combination of process and catalyst variables.

A comparison of the results of Runs 29 and 30 indicates that the ease of homogeneous copolymerization is an inverse function of the comonomer size. These runs illustrate the copolymerization of ethylene with 1-octene (Run 29) and with 1-octadecene (Run 30) under similar reaction conditions using ethylaluminum dichloride and vanadium oxychloride as the catalyst components. The data of Runs 31 to 32, Table III indicate a similar decrease in copolymer homogeneity index when using 1-butene comonomer in place of 1-octene comonomer with the same catalyst system. In general, it is observed that the catalysts which are suitable for the copolymerization of higher α-olefins are more limited than those suitable for copolymerization of the lower α-olefins.

Runs 33 and 34 illustrate the effect of increasing the reactor temperature in the copolymerization of ethylene with 1-butene using an (ethyl)AlCl$_2$—VO(O-n-butyl)$_3$ catalyst system. At reactor temperatures above 130° C., the butene copolymer crystalline melting point increases at a given comonomer content indicating an increase in copolymer heterogeneity. Runs 37 to 39 illustrate the effect of temperature on octene copolymer homogeneity using the catalyst system (ethyl)$_{1.5}$AlCl$_{1.5}$ ª—VOCl$_3$ and runs 35, 36 show the same effect with the (ethyl)$_{1.5}$AlCl$_{1.5}$—VO(O-n-decyl)$_2$Cl catalyst system. These data show that the maximum reactor temperature for the synthesis of octene copolymers ª Equimolar mixture of (ethyl)$_2$AlCl and (ethyl)AlCl$_2$.

of homogeneity index >75 is in the range 110 to 115° C., although the temperature may be slightly higher for the synthesis of butene copolymers.

Runs 40 to 41, Table V, illustrate the low copolymer homogeneity obtained when R$_2$AlCl is used as alkylating agent rather than R$_{1.5}$AlCl$_{1.5}$ (Run 13, Table II) or RAlCl$_2$ (Run 14, Table II). This pronounced change in copolymer homogeneity between an alkyl/aluminum ratio of 1.5 and an alkyl/aluminum ratio of 2 was totally unexpected based on the prior art.

Runs 42 to 45, Table VI, illustrate the effect of the ratio of the alkyl aluminum halide to the vanadium compound VO(O-n-butyl)$_3$ on butene copolymer homogeneity (Run 42) and on octene copolymer homogeneity (Runs 43 to 45). For VO(OR)$_n$X$_{3-n}$ based catalyst systems where $n \geq 1$ the minimum Al/V ratio is dependent on the particular comonomer used. Long chain α-olefins such as 1-octene, require a higher Al/V ratio than shorter chain α-olefins, such as 1-butene. The data indicate that a minimum Al/V ratio of about 5/1 for butene copolymers must be maintained in the reactor and that the minimum Al/V ratio for octene copolymers is about 9/1. For α-olefins of C$_{10}$ to C$_{20}$, an Al/V ratio of at least 12/1 should be maintained in the reactor.

With VOCl$_3$ based catalyst systems, on the other hand, an Al/V ratio of $\geq 5$ is suitable for homogeneous copolymerization of either butene (Run 46, Table VI) or octene (Run 47, Table VI) but 1-octadecene cannot be homogeneously copolymerized with this catalyst system even at high Al/V ratios (Run 30, Table III).

Runs 48 to 54, Table VII, illustrate the effect of vanadium concentration in the reactor on copolymer homogeneity. The results indicate that in order to obtain homogeneous octene copolymer, the vanadium concentration should not exceed about 0.16 mmole/litre for systems based on VOCl$_3$ (Runs 51 and 52) and about 0.260 mmole/litre for systems based on VO(OR)$_2$Cl (Runs 53 and 54). The catalyst concentration effect is less pronounced with shorter chain α-olefins, such as 1-butene, but Runs 48 to 50 indicate that with VOCl$_3$, the highest level of homogeneity is obtained at catalyst concentrations below about 0.260 mmole/litre.

The effect of the chemical structure of the vanadium compound on copolymer homogeneity is intimately related to α-olefin comonomer size, vanadium concentration in the reactor, reactor temperature, Al/V ratio and R/Al ratio in the alkyl aluminum halide. When the other variables affecting comonomer distribution are not adjusted to optimum values trialkyl vanadates and dialkyl chlorovanadates show a reduced tendency to heterogeneous copolymerization in comparison with VOCl$_3$ or VCl$_4$. A comparison of Runs 51 and 53, Table VII, shows that, at high vanadium concentrations using 1-octene as comonomer distribution of the whole copolymer must be considerably broader than the copolymer analysis of the fractions would indicate.

The ethylene/1-butene copolymer produced in Run 3 using a coordination catalyst system recommended for ethylene/propylene rubbers, was subjected to fractionation and the results are tabulated in Table X, above.

The copolymer is heterogeneous and shows no improvement over the ethylene/1-butene copolymers prepared in Run 1.

Similarly, the ethylene/1-octene copolymer produced in Run 8 using catalyst formulations recommended for ethylene/propylene rubbers was subjected to fractionation and found to be heterogeneous, as shown by the following table.

TABLE XI

Copolymer fractionation data:
Copolymer No. Run 8, Table I
Octene Copolymer
Melt Index—1.20.

[Density—0.9347, amount fractionated—10.0 grams, percent recovery 96.8]

| | Fractionation— | | | | | |
|---|---|---|---|---|---|---|
| | Corrected fraction weight (grams) | Cumulative weight percent | Inherent viscosity | $M_w \times 10^{-3}$ | Side chain $CH_3$/ 100C | DSC melting point |
| Fraction No.: | | | | | | |
| 1 | (1) | (1) | (1) | (1) | (1) | (1) |
| 2 | 0.108 | 63.73 | 1.21 | 45 | | |
| 3 | 0.651 | 59.93 | 0.71 | 21.8 | 1.12 | |
| 4 | 2.057 | 46.39 | 0.64 | 19 | 1.23 | |
| 5 | 0.374 | 34.24 | 0.53 | 14.5 | 1.23 | |
| 6 | 0.909 | 27.82 | 0.45 | 11.5 | 1.20 | |
| 7 | 0.698 | 19.79 | 0.34 | 8 | 1.26 | |
| 8 | 1.630 | 8.23 | 0.26 | 5.6 | | |
| | Refractionation— | | | | | |
| 1 | 0.618 | 96.84 | 8.48 | 620 | | |
| 2 | 0.362 | 91.94 | 6.75 | 428 | 0.35 | |
| 3 | 0.380 | 88.23 | 4.70 | 280 | 0.60 | |
| 4 | 0.237 | 85.14 | 3.81 | 212 | 0.73 | |
| 5 | 0.216 | 82.88 | 2.98 | 150 | 0.78 | |
| 6 | 0.327 | 80.16 | 2.70 | 132 | 0.68 | |
| 7 | 0.272 | 77.17 | 2.14 | 96 | 0.77 | |
| 8 | 0.191 | 74.85 | 1.51 | 60 | 0.87 | |
| 9 | 0.278 | 72.51 | 1.12 | 40 | 0.93 | |
| 10 | 0.258 | 69.83 | 0.86 | 28 | 0.98 | |
| 11 | 0.427 | 66.40 | 0.58 | 16.5 | | |
| Whole polymer | | | 1.73 | 107 | 0.98 | 105.9, 109.5, 117.5 |

1 Used in refractionation.

The ethylene/1-butene copolymer of Run 28, prepared in accordance with the present invention using a catalyst prepared by mixing ethyl aluminum dichloride and vanadium oxychloride, was subjected to fractionation. The results are tabulated in the following table.

TABLE XII

Copolymer fractionation data:
Copolymer No. Run 28, Table II
Melt Index—20.2
Density—0.9184

[Amount fractionated—10.0 grams, percent recovery—96.80]

| | Fractionation | | | | | |
|---|---|---|---|---|---|---|
| | Corr. fraction weight (grams) | Cumulative weight percent | Inherent viscosity | Weight average molecular weight $M_w$ | Side chain $CH_3$/- 100C | DSC melting point |
| Fraction No.: | | | | | | |
| 1 | (1) | (1) | (1) | (1) | (1) | (1) |
| 2 | 0.566 | 31.17 | 1.01 | 35.5 | 1.33 | |
| 3 | 0.929 | 23.29 | 0.84 | 27 | 1.48 | |
| 4 | 0.314 | 17.48 | 0.64 | 19 | 1.49 | |
| 5 | 0.295 | 14.43 | 0.54 | 15 | 1.44 | |
| 6 | 0.270 | 11.61 | 0.44 | 11.4 | 1.42 | |
| 7 | 0.331 | 8.60 | 0.38 | 9.2 | 1.46 | |
| 8 | 0.695 | 3.67 | 0.31 | 6 | | |
| | Refractionation | | | | | |
| 1 | 0.711 | 96.45 | 1.93 | 84 | 1.35 | |
| 2 | 0.361 | 91.09 | 1.43 | 56 | 1.29 | |
| 3 | 0.846 | 85.06 | 1.30 | 50 | 1.44 | |
| 4 | 0.847 | 76.59 | 1.24 | 46 | 1.47 | |
| 5 | 0.629 | 69.21 | 1.11 | 40 | 1.42 | |
| 6 | 0.615 | 62.99 | 1.03 | 36 | 1.32 | |
| 7 | 0.571 | 57.06 | 0.95 | 32.5 | 1.32 | |
| 8 | 0.623 | 51.09 | 0.84 | 27 | 1.46 | |
| 9 | 0.532 | 45.32 | 0.77 | 24 | 1.44 | |
| 10 | 0.374 | 40.79 | 0.68 | 20.5 | 1.42 | |
| 11 | 0.492 | 36.46 | 0.57 | 16 | 1.40 | |
| Whole polymer | | | 0.95 | 47 | 1.40 | 103.9 |

1 Used in refractionation.

The results show that all the molecular weight fractions contain equivalent amounts of comonomer.

A homogeneous, random ethylene/1-butene copolymer prepared according to the process of the present invention was extruded in blown film form. The properties of this film were then compared with the properties of film prepared from conventional ethylene/1-butene copolymer. The results of the comparisons are tabulated in the following tables.

TABLE XIII.—PHYSICAL PROPERTIES OF BLOWN COPOLYMER FILM [1]

| Copolymer type | Homogeneous-random butene copolymer | Heterogeneous-random butene copolymer |
|---|---|---|
| Copolymer: | | |
| Melt index | 1.94 | 1.62 |
| Stress exponent | 1.22 | 1.31 |
| Density | 0.9189 | 0.9190 |
| Film properties: | | |
| Elastic modulus: | | |
| MD | 24,600 | 24,500 |
| TD | 25,600 | 29,600 |
| Haze | 13.9 | 31.1 |
| Gloss: | | |
| Outside | 45 | 8 |
| Inside | 47 | 10 |
| Tensiles MD: | | |
| Elongation, percent | 725 | 825 |
| Yield strength, p.s.i. | 1,600 | 1,650 |
| Ultimate breaking strength, p.s.i. | 4,400 | 4,400 |
| Tensiles TD: | | |
| Elongation, percent | 750 | 900 |
| Yield strength p.s.i. | 1,600 | 1,600 |
| Ultimate breaking strength, p.s.i. | 4,350 | 4,100 |
| Gauge, mils | 2.46 | 2.45 |
| Impact strength, 26" dart test | 139 | 109 |

[1] Extruder type 2" Royle, die gap 25 mils.

TABLE XIV.—TEAR STRENGTHS OF EXTRUDED FLAT FILM [1]

| Copolymer | Extrusion draw ratio | Film thickness (mils) | Elmendorf tear strength | | TD/MD tear ratio |
|---|---|---|---|---|---|
| | | | TD | MD | |
| Homogeneous-random octene copolymer: melt index, 2.2, density, 0.9195 | 14.5 | 1.17 | 370 | 290 | 1.3 |
| | 18.9 | 0.90 | 380 | 238 | 1.6 |
| | 29.8 | 0.57 | 459 | 202 | 2.3 |
| Heterogeneous-random octene copolymer: melt index, 1.8, density, 0.9185 | 9.2 | 1.85 | 360 | 197 | 1.8 |
| | 13.4 | 1.27 | 443 | 156 | 2.8 |
| | 17.0 | 1.00 | 577 | 124 | 4.6 |
| | 28.4 | 0.60 | 658 | 72 | 9.1 |

[1] Film extruded on small Instron mounted ram extruder.

The copolymers of the present invention are of practical importance because of the effect of the homogeneous comonomer distribution and narrow molecular distribution on their physical and optical properties. Films of these copolymers show a reduced haze level, higher impact strength, reduced tendency towards delamination, and a better balance of physical properties in the machine and transverse directions.

The embodiments of the invention in which an exclusive property or privilege is claimed are defined as follows:

1. Continuous process for the preparation of homogeneous random partly crystalline copolymers of narrow molecular weight distribution, said copolymers having a homogeneity index of at least 75 as determined by the equation:

$$HI = 100 \frac{130 - 7.42(CH_3) + 0.414(CH_3)^2 - MP_{TC}}{11.09 CH_3 - 0.553(CH_3)^2}$$

where

HI equals homogeneity index
$CH_3$ = Total $CH_3$/100C + vinyl/100C
$MP_{TC}$ = melting point of the copolymer, comprising ethylene and at least one alpha-monoolefin having four or more carbon atoms consisting essentially of the steps of polymerizing the monomers dissolved in an inert nonpolymerizable solvent therefor and for the copolymer to be prepared in an agitated essentially turbulent reaction zone maintained at a pressure sufficient to maintain the monomers in solution and at a temperature of 40° to 100° C. in the presence of a catalyst prepared by mixing (A) an organo-aluminum halide $R_n AlX_{3-n}$ wherein R is an alkyl or aryl radical, $n$ is not greater than 1.5 or less than 1.0 and X is Cl or Br and (B) a vanadium compound selected from (1) $VO(OR)_m X_{3-m}$ where R is an alkyl or aryl radical, $m$ is not less than 1 or more than 3, and X is Cl or Br and (2) vanadium oxyhalides soluble in the reaction medium; provided that when the vanadium compound is selected from (1) the vanadium concentration in the reaction zone is not greater than 0.260 millimoles/liter of solution and the Al/V ratio in the reaction zone is not less than 5/1 when the alpha-olefin is a $C_4$ or $C_5$ alpha-olefin, not less than 9/1 when the alpha-olefin is a $C_6$ to $C_9$ alpha-olefin and not less than 12/1 when the alpha-olefin is a $C_{10}$ to $C_{20}$ alpha-olefin, and that when the vanadium compound is selected from (2) the vanadium concentration in the reactor is not greater than 0.160 millimoles/liter of solution and the Al/V ratio in the reaction zone is not less than 5/1 when the alpha-olefin is a $C_4$ to $C_9$ alpha-olefin.

2. The process according to claim 1 wherein the α-olefin is 1-butene.

3. The process according to claim 2 wherein catalyst component (A) is $(ethyl)_{1.5} AlCl_{1.5}$ and catalyst component (B) is $VO(O-n-butyl)_2 Cl$ and the Al/V ratio in the reaction zone is about 5/1 to about 10/1.

4. The process according to claim 2 wherein catalyst component (A) is $(ethyl)_{1.5} AlCl_{1.5}$ and catalyst component (B) is $VOCl_3$ and the Al/V ratio in the reaction zone is about 5/1 to about 10/1.

5. The process according to claim 1 wherein the α-olefin is 1-octene.

6. The process according to claim 5 wherein catalyst component (A) is $(ethyl)_{1.5} AlCl_{1.5}$ and catalyst component (B) is $VO(O-n-butyl)_2 Cl$ and the Al/V ratio in the reaction zone is about 9/1 to about 15/1.

7. The process according to claim 5 wherein catalyst component (A) is $(ethyl)_{1.5} AlCl_{1.5}$ and catalyst component (B) is $VOCl_3$ and the Al/V ratio in the reaction zone is about 5/1 to about 10/1.

8. The process according to claim 1 wherein the α-olefin comprises a mixture of 1-butene and 1-octene.

9. The process according to claim 8 wherein catalyst component (A) is $(ethyl)_{1.5} AlCl_{1.5}$ and catalyst component (B) is $VO(O-n-butyl)_2 Cl$ and the Al/V ratio in the reaction zone is about 9/1 to about 15/1.

10. The process according to claim 8 wherein catalyst component (A) is $(ethyl)_{1.5} AlCl_{1.5}$ and catalyst component (B) is $VOCl_3$ and the Al/V ratio in the reaction zone is about 5/1 to about 10/1.

11. A process according to claim 1 in which the homogeneous random partly crystalline copolymer has a homogeneity index in excess of 90.

12. A process according to claim 6 in which the homogeneous random partly crystalline copolymer has a homogeneity index in excess of 90.

13. A process according to claim 10 in which the homogeneous random partly crystalline copolymer has a homogeneity index in excess of 90.

(References on following page)

References Cited

UNITED STATES PATENTS

| | | | |
|---|---|---|---|
| 3,067,184 | 12/1962 | Cines | 260—88.2 |
| 3,304,292 | 2/1967 | Hagemeyer | 260—88.2 |
| 3,435,017 | 3/1969 | Natta | 260—93.7 |

FOREIGN PATENTS

| | | |
|---|---|---|
| 1,059,864 | 3/1967 | Great Britain. |

OTHER REFERENCES

Copolymerization, edited by George E. Ham, High Polymers, volume XVIII, Interscience Publishers, a div. of John Wiley and Sons, New York, 1962, pp. 116–118.

JOSEPH L. SCHOFER, Primary Examiner

R. S. BENJAMIN, Assistant Examiner

U.S. Cl.X.R.

260—88.2 R & F